US011388127B1

(12) United States Patent
Tikoian et al.

(10) Patent No.: US 11,388,127 B1
(45) Date of Patent: Jul. 12, 2022

(54) COMMUNICATION OF MESSAGES OF AN APPLICATION IN AN UNLAUNCHED STATE

(71) Applicant: Capital One Services, LLC, McLean, VA (US)

(72) Inventors: Kathryn Tikoian, Arlington, VA (US); Joshua Edwards, Philadelphia, PA (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/301,189

(22) Filed: Mar. 29, 2021

(51) Int. Cl.
*G06F 15/16* (2006.01)
*H04L 51/00* (2022.01)
*H04L 9/40* (2022.01)
*H04L 51/42* (2022.01)
*G06F 3/04883* (2022.01)

(52) U.S. Cl.
CPC .......... *H04L 51/14* (2013.01); *G06F 3/04883* (2013.01); *H04L 51/22* (2013.01); *H04L 63/0892* (2013.01)

(58) Field of Classification Search
CPC ..... H04L 51/14; H04L 51/22; H04L 63/0892; G06F 3/04883
USPC ........................................ 709/206, 217, 229
See application file for complete search history.

(56) References Cited

U.S. PATENT DOCUMENTS

| | | | |
|---|---|---|---|
| 8,607,317 B2* | 12/2013 | Lee .......................... | H04L 51/04 709/206 |
| 10,942,913 B1* | 3/2021 | Khoyilar .................. | G06F 9/542 |
| 11,122,014 B2* | 9/2021 | Kaczynski ............ | H04L 9/0863 |
| 2008/0082821 A1* | 4/2008 | Pritikin .................. | G06F 40/174 713/169 |
| 2011/0099612 A1* | 4/2011 | Lee ........................ | H04L 9/3213 726/6 |
| 2016/0050037 A1* | 2/2016 | Webb ................... | G08B 27/005 455/3.01 |
| 2020/0244627 A1* | 7/2020 | Kaczynski ............ | H04L 9/3213 |
| 2020/0245134 A1* | 7/2020 | Kaczynski .............. | H04L 41/06 |

* cited by examiner

*Primary Examiner* — Liang Che A Wang
(74) *Attorney, Agent, or Firm* — Harrity & Harrity, LLP

(57) ABSTRACT

In some implementations, a device of a user may receive user input indicative of a selection of an application implemented by the device. The user input may be received via a graphical user interface presented by the device. The user input may be received while the application is in an unlaunched state in which the user is unauthenticated for use of the application. The device may obtain, while the application is in the unlaunched state, one or more messages of the application. The device may cause, while the application is in the unlaunched state, information indicative of at least one message, of the one or more messages, to be displayed in the graphical user interface.

20 Claims, 9 Drawing Sheets

COMMUNICATION OF MESSAGES OF AN APPLICATION IN AN UNLAUNCHED STATE

BACKGROUND

A display of a user device may display a user interface (e.g., a graphical user interface). A user interface may permit interactions between a user of the user device and the user device. In some cases, the user may interact with the user interface to operate and/or control the user device to produce a desired result. For example, the user may interact with the user device to cause the user device to perform an action. Additionally, the user interface may provide information to the user.

SUMMARY

In some implementations, a non-transitory computer-readable medium storing a set of instructions for obtaining messages of an application includes one or more instructions that, when executed by one or more processors of a device, cause the device to: receive user input, from a user, indicative of a selection of the application implemented by the device, wherein the user input is received via a graphical user interface presented by the device, and wherein the user input is received while the application is in an unlaunched state in which the user is unauthenticated for use of the application; transmit, to a remote device and while the application is in the unlaunched state, a request for one or more messages of the application; receive, from the remote device and based on an authorization of the user that uses information identified by the request, the one or more messages of the application; and cause, while the application is in the unlaunched state, information indicative of at least one message, of the one or more messages, to be displayed in the graphical user interface.

In some implementations, a method of obtaining messages of an application includes receiving, at a device of a user, user input indicative of a selection of the application implemented by the device, wherein the user input is received via a graphical user interface presented by the device, and wherein the user input is received while the application is in an unlaunched state in which the user is unauthenticated for use of the application; obtaining, by the device and while the application is in the unlaunched state, one or more messages of the application; and causing, by the device and while the application is in the unlaunched state, information indicative of at least one message, of the one or more messages, to be displayed in the graphical user interface.

In some implementations, a system for providing messages of an application includes one or more memories and one or more processors, communicatively coupled to the one or more memories, configured to: receive, from a device of a user, a request for one or more messages of the application implemented by the device, wherein the request is received while the application is in an unlaunched state in which the user is unauthenticated for use of the application; determine that the user is authorized to receive messages of the application based on information identified by the request; and transmit, to the device and while the application is in the unlaunched state, the one or more messages of the application to cause the device to display information indicative of at least one message, of the one or more messages, in a graphical user interface presented by the device.

DETAILED DESCRIPTION

Figure 1A:
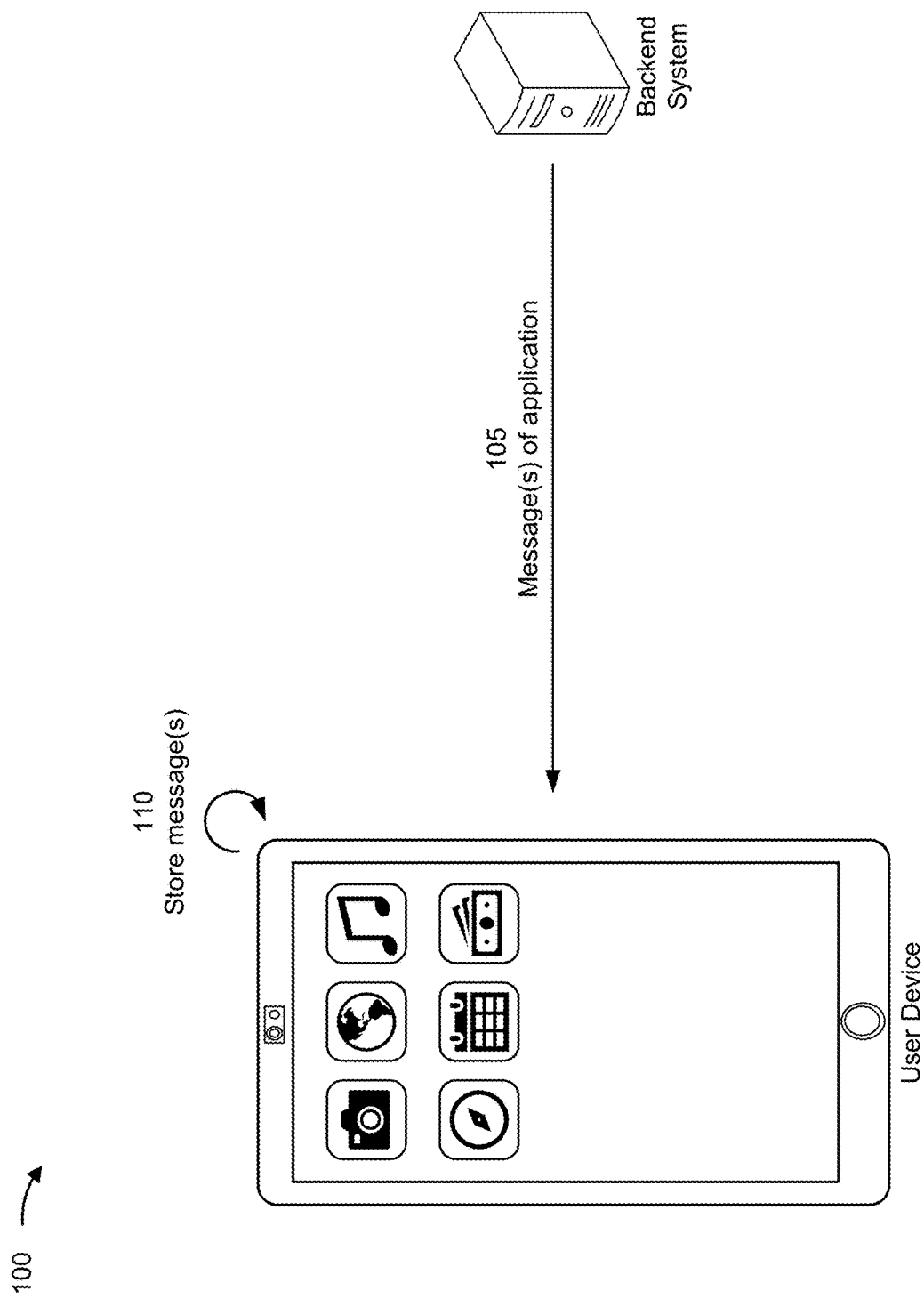
FIGS. 1A-1E are diagrams of an example implementation relating to communication of messages of an application in an unlaunched state.

The following detailed description of example implementations refers to the accompanying drawings. The same reference numbers in different drawings may identify the same or similar elements.

A user device, such as a mobile device, may implement various applications that enhance the capabilities of the user device. Commonly, the user device may present a user interface (e.g., a graphical user interface (GUI)) in which icons representative of the applications are displayed. A user of the user device may launch an application by selecting the application in the user interface (e.g., by tapping on an icon representative of the application).

In some examples, when an application is in an unlaunched state, the user device may provide a notification indicating the existence of a message for the application. Accordingly, the user may launch the application to view the message. For example, upon launching the application, the user may authenticate with the application (or the application may recognize the user based on a previous authentication), and the application may communicate the authentication to a backend system (e.g., a message server) in order to retrieve the message. This process is cumbersome and consumes excessive computing resources and/or network resources in connection with launching the application and performing the user authentication. Moreover, the user device may implement dozens of applications that may have messages for viewing by the user, thereby requiring the process to be performed multiple times.

In some implementations, to solve the problems described above, as well as the technical problem of how to enable a user of a user device to view a message associated with an application when the application is in an unlaunched state in which the user is unauthenticated (i.e., not authenticated), a technical solution is described herein for authorizing a user to view a message for an application that is in an unlaunched state in which the user is unauthenticated. In some implementations, a user device may receive a user input, from a user, indicative of a selection of an application. For example, the user input may be a long press touch gesture on a display of the user device. The user device may receive the user input while the application is in an unlaunched state. For example, the user input may be received in a user interface in which an icon for the application is displayed. In some implementations, the user device may transmit, to a backend system, a request for messages of the application (e.g., while the application is in the unlaunched state). The backend system may determine an authorization of the user based on information identified by the request. For example, the backend system may use a device identifier of the user device to determine the authorization of the user (e.g., based on whether the device identifier has an association with an account of the user). Based on the authorization of the user, the user device may receive messages from the backend system for display by the user device.

In some implementations, the user device may receive an alternative version of a message that is to be used when the user is unauthenticated for use of the application (e.g., while the application is in the unlaunched state). For example, the alternative version of the message may omit sensitive information. In some implementations, the user device may receive multiple versions of a message. For example, the user device may receive a first version of the message, that is to be used when the user is authenticated for use of the application, and a second version of the message that is to be used when the user is unauthenticated for use of the application. The user device may store the message (e.g., the one or more versions of the message) for subsequent display at the request of the user. In some implementations, the user device may display messages of an application in accordance with a prioritization of the messages. In some cases, the backend system may transmit messages to the user device along with information for use in identifying a prioritization of the messages.

In this way, the user device may receive and display messages (or information indicative of the messages) of an application while the application is in an unlaunched state in which the user is unauthenticated for use of the application. Accordingly, the user may view the messages without launching the application and without performing an authentication with the application. Thus, computing resources and/or network resources, associated with excessive launching of applications to view messages and/or excessive authentication processes to view messages, are conserved.

FIGS. 1A-1E are diagrams of an example implementation 100 associated with communication of messages of an application in an unlaunched state. As shown in FIGS. 1A-1E, example implementation 100 includes a user device (e.g., a mobile device) and a backend system (e.g., which may include one or more server devices). These devices are described in more detail below in connection with FIG. 2 and FIG. 3. The user device may be associated with a user. The user device may implement an application (e.g., a "mobile app"). The backend system may communicate with the user device to support operations of the application of the user device. In some implementations, the application implemented by the user device may be a banking application. The banking application may enable a user, via the user device, to check an account balance, pay a bill, transfer funds, and/or receive messages relating to account balance or bill payment, among other examples. In some implementations, the application implemented by the user device may be another type of application.

As shown in FIG. 1A, and by reference number 105, the user device may receive one or more messages of the application (e.g., the one or more messages may be for, or otherwise related to, the application) from the backend system. The user device may receive the one or more messages while the application is executing on the user device as a background process. The messages may include information associated with one or more functions or features of the application. For example, the application may be a banking application, as described above, and the messages may include information relating to an account balance, information relating to a payment due date, or the like.

In some implementations, the user device may receive multiple versions of a message from the backend system. The user device may receive a first version of the message that is to be used when the user is authenticated for use of the application, and a second version of the message that is to be used when the user is unauthenticated for use of the application. For example, the first version of the message may include the full message and the second version of the message may include an alternative version of the full message. The alternative version may be a modified version of the full message, a shorter version of the full message, a redacted version of the full message, or the like. As an example, the first version of the message may indicate "your account balance is $106.23," and the second version of the message may indicate "your account balance is low."

As shown by reference number 110, the user device may store the one or more messages received from the backend system (e.g., in a storage of the user device). For example, the user device may store the messages in a message cache. In some implementations, the user device may store the multiple versions of a message, as described above. The user device may store the messages for subsequent presentation to the user (e.g., in response to a request by the user), as described below. For example, the user device may determine which version of the message is to be presented to the user based on whether the user is authenticated for use of the application and/or based on whether the full message includes information that can only be accessed by the user when the user is authenticated.

Figure 1B:
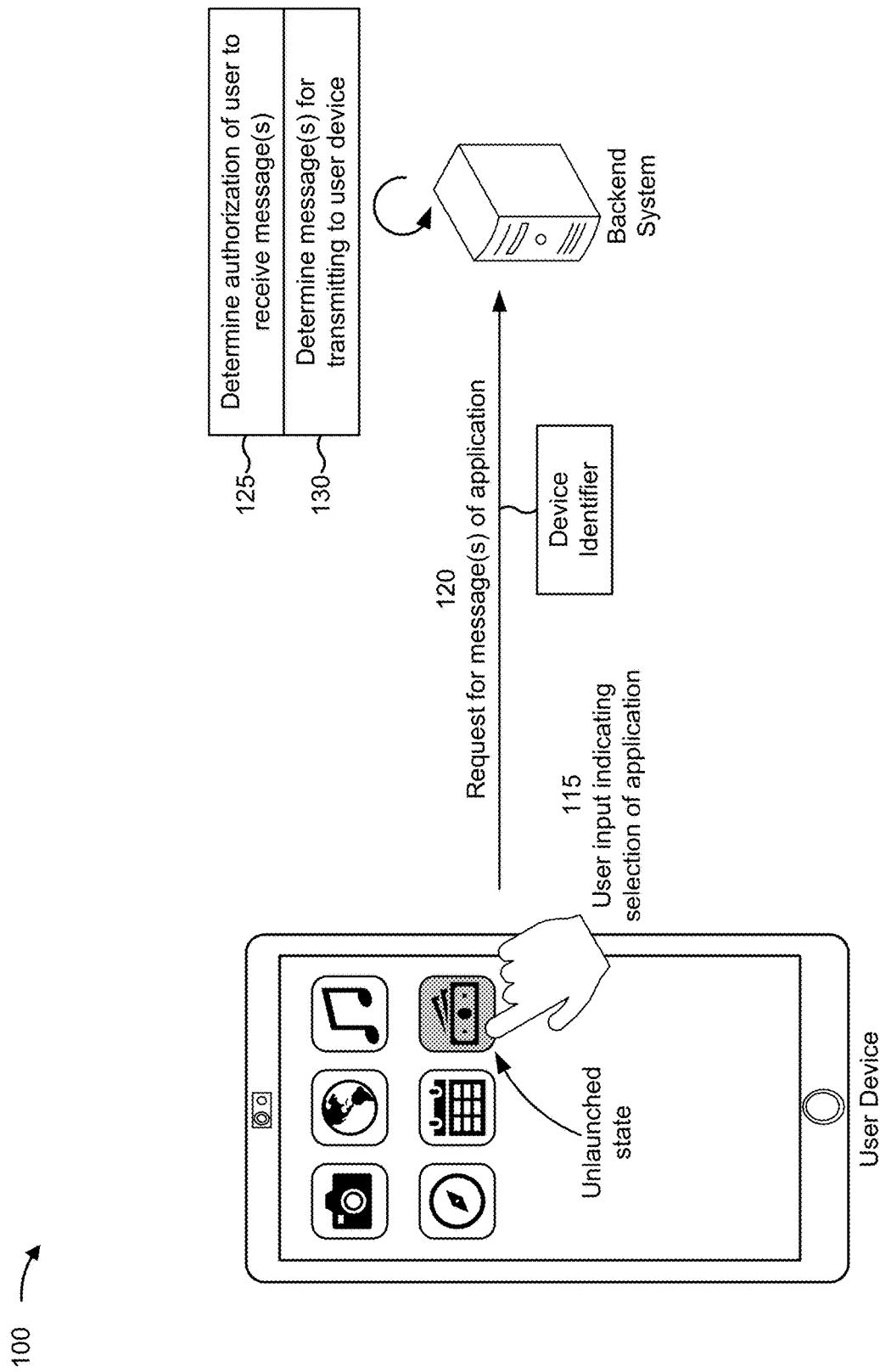

As shown in FIG. 1B, and by reference number 115, the user device may receive user input, from the user, indicative of a selection of the application. The user device may receive the user input while the application is in an unlaunched state. In the unlaunched state, the application may be closed or otherwise unavailable to the user. In contrast, in a launched state, the application may be open or otherwise available to the user. In the unlaunched state, the user may be unauthorized for use of the application. For example, upon launching the application, the user may enter a username and/or a password in a user interface of the application to enable authentication of the user. As another example, upon launching the application, the application may recognize the user as being authenticated based on a previous authentication.

The user device may receive the user input via a user interface (e.g., a GUI) presented by the user device. As shown, the user interface may include icons representative of one or more applications implemented by the user device (e.g., the user interface may include an icon for the application). The user may indicate a request to launch the application by interacting with the icon representing the application in a particular manner (e.g., by performing a tap touch gesture on an area of a display of the user device associated with the icon). Accordingly, in the user interface that includes the icon for the application, the application is in the unlaunched state.

In some implementations, the user input is a long press touch gesture. The long press touch gesture may be on an area of a display (e.g., a touch screen) of the user device associated with the icon, to thereby indicate selection of the application. In connection with a long press touch gesture, the user's finger may be in continuous contact with the display of the user device for a longer duration relative to a tap touch gesture. For example, a long press touch gesture may be indicated by a continuous contact with the display that lasts for longer than a threshold duration (e.g., 0.25 seconds, 0.5 seconds, or the like), and a tap touch gesture may be indicated by a contact with the display that lasts for less than the threshold duration. In some implementations, a long press touch gesture indicating selection of the application may cause the user device to display, in the user interface, a menu (e.g., a quick-view menu) associated with the application (while a tap touch gesture indicating selection of the application may cause the user device to launch the application and display a different user interface associated with the application).

As shown by reference number 120, based at least in part on receiving the user input indicating selection of the application, the user device may transmit a request for one or more messages of the application to the backend system. That is, the request may indicate that the backend system is to transmit any messages associated with the application to the user device. In some implementations, the user device may transmit the request if messages of the application are not previously received and stored by the user device, as described above in connection with reference numbers 105 and 110. In some implementations, the application may be a banking application, as described above, and the messages may include information relating to an account balance, information relating to a payment due date, or the like.

The user device may transmit the request while the application is in the unlaunched state. Thus, the request may omit information indicating authentication of the user (e.g., the request may omit an authentication token that is generated based on an authentication of the user) that may otherwise be present in a request for messages when the application is in a launched state. In some implementations, the request may identify information, other than authentication information, that can be used for authorizing the user to receive the messages. For example, the request may include an identifier of the user device (that is, a device identifier). The device identifier may be a unique identifier that identifies the user device.

As shown by reference number 125, the backend system may determine whether the user is authorized to receive the messages of the application. The backend system may determine whether the user is authorized based on information identified by the request. For example, the backend system may determine whether the user is authorized based on the device identifier included in the request. In some examples, the backend system may determine that the user is authorized based on a determination that the device identifier has an association with an account of the user. For example, based on a previous authentication of the user when the application was in the launched state, the backend system may store information identifying the association of the device identifier and the account, and the backend system may use this association to subsequently authorize the user to receive the messages. Moreover, the backend system may determine that the user is authorized based on a determination that the association between the device identifier and the backend system has endured for a threshold time period (e.g., one month, one year, or the like).

In some implementations, the user device may determine whether the user is authorized. The user device may determine whether the user is authorized based on information associated with the user's use of the user device. For example, the user device may determine that the user is authorized based on a determination that the user has authenticated with another application implemented by the user device. In examples where the user device determines whether the user is authorized, the request may include an indication that the user is authorized, and the backend system may determine that the user is authorized based on the indication.

As shown by reference number 130, based on a determination that the user is authorized, the backend system may determine one or more messages of the application that are to be transmitted to the user device. For example, the backend system may determine whether any messages are available for the application, and the backend system may determine to transmit the messages that are available for the application. In some implementations, the backend system may determine whether to transmit a full version of a message (e.g., a first version of the message, as described above) or an alternative version of the message (e.g., a second version of the message, as described above). For example, the backend system may determine whether the message includes information that is not to be displayed when the user is unauthenticated for use of the application, and the backend system may determine a version of the message that is to be used when the user is unauthenticated.

In some examples, the backend system may determine to transmit the full version of the message based on a determination that the message does not include information that can only be accessed by the user when the user is authenticated. Here, for example, the full version of the message may include non-user-specific information that is suitable for viewing by a general audience (e.g., an offer for a new credit card or bank account, a promotion, or the like). In some examples, the backend system may determine to transmit the alternative version of the message based on a determination that the full version of the message includes information that can only be accessed by the user when the user is authenticated. Here, for example, the full version of the message may include user-specific information, or other information that is suitable for viewing only by the user (e.g., an account balance, an amount of a minimum payment that is due, a credit score, or the like). Thus, for example, if the full version of the message indicates an amount of the user's account balance, the alternative version may merely indicate that the user's account balance is low; if the full version of the message indicates an amount of a minimum payment that is due, the alternative version may merely indicate that a payment is due; etc.

In some implementations, the backend system may determine a content for the alternative version of the message. For example, the backend system may determine a modified version and/or a redacted version of the full message (e.g., using natural language processing, using one or more rules, or the like) that omits user-specific, or otherwise sensitive, information of the full message. In some implementations, the backend system may determine whether to transmit the full version of the message or the alternative version of the message based on one or more rules (e.g., rules that indicate message types that are suitable for viewing by unauthenticated users), using machine learning (e.g., using a machine learning model trained to identify whether a message is suitable for viewing by an unauthenticated user), or the like. In some implementations, the backend system may transmit both of the full version and the alternative version of the message to the user device, and the user device may determine which version of the message is to be presented to the user based on whether the user is authenticated for use of the application and/or based on whether the full message includes information that can only be accessed by the user when the user is authenticated.

In some implementations, the backend system may determine a prioritization (e.g., a weighting) of the one or more messages that are to be transmitted to the user device. For example, the backend system may determine whether a message is a high priority message (e.g., a message that should be presented to the user when the application is in the unlaunched state) or a low priority message. As another example, the backend system may determine a priority order for multiple messages. That is, the backend system may determine whether a first message is to be prioritized over a second message (e.g., for presentation to the user when the application is in the unlaunched state).

In some implementations, the backend system may determine the prioritization of the one or more messages using a machine learning model. For example, the machine learning model may be trained to predict whether a message is important to the user and/or trained to determine a score indicative of an importance of a message to the user. The backend system, or another system, may train the machine learning model based on one or more parameters associated with message importance, such as a type of a message, a content of a message, an application function to which a message relates, whether the message contains user-specific information, or the like. The backend system, or the other system, may train the machine learning model, according to the one or more parameters, using historical data associated with the user's use of the user device (and/or the use of other devices by other users). Using information associated with the one or more parameters as inputs to the machine learning model, the user device may determine an importance of the one or more messages in order to determine a prioritization of the one or more messages.

In some implementations, the machine learning model may predict whether a message is important to the user and/or determine a score indicative of an importance of a message to the user based on the user's use of the application. For example, the machine learning model may determine the prediction or the score based on whether the user interacted with an application function to which the message relates, how recently the user interacted with the application function, a duration for which the user interacted with the application function, or the like.

Figure 1C:
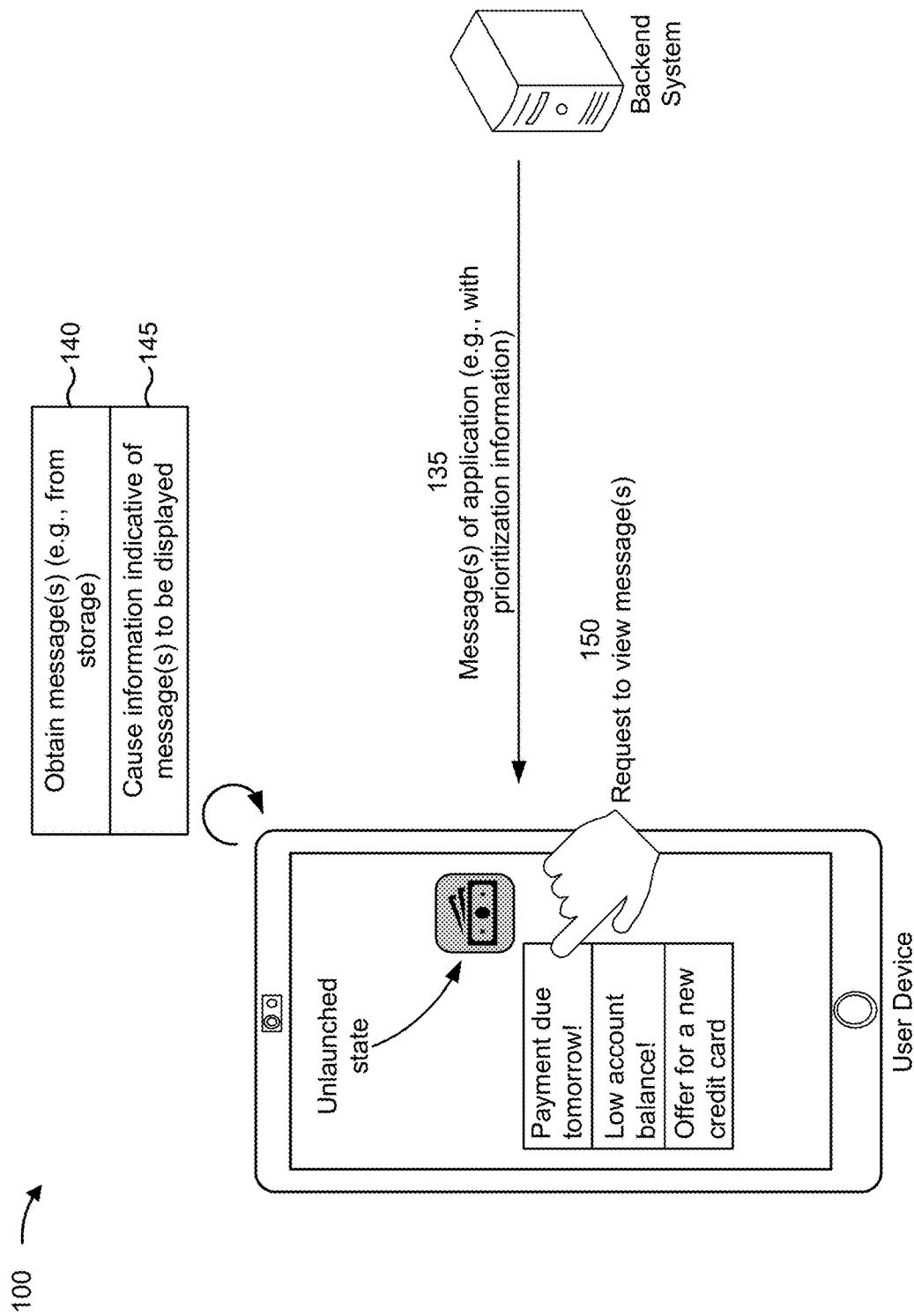

As shown in FIG. 1C, and by reference number 135, the backend system may transmit one or more messages of the application. The backend system may transmit a full version of a message (e.g., without transmitting an alternative version of the message), may transmit the alternative version of the message (e.g., without transmitting the full version of the message), or may transmit both the full version and the alternative version of the message. For example, based on determining that the message includes information that is not to be displayed when the user is unauthenticated, the backend system may transmit the alternative version of the message without transmitting the message (e.g., the full version of the message).

In some implementations, the backend system may transmit the one or more messages along with information for use in identifying a prioritization (e.g., a priority order) for the one or more messages. For example, the information may identify whether a message is a high priority message, a low priority message, or the like. As another example, the information may identify a priority order for the one or more messages. As a further example, the information may include an importance prediction and/or an importance score, as described above, for a message.

As shown by reference number 140, the user device may obtain one or more messages of the application. The one or more messages may include multiple messages. In some implementations, the user device may obtain the one or more messages from a storage (e.g., a message cache) of the user device. For example, the user device may obtain the messages stored by the user device, as described above in connection with reference number 110. In some implementations, if messages were not previously stored by the user device (as described above in connection with reference number 110), the user device may obtain the one or more messages by receiving the one or more messages transmitted by the backend system, as described above in connection with reference number 135. The user device may obtain the one or more messages while the application is in the unlaunched state. Moreover, the user device may obtain the one or more messages based on the user input indicating the selection of the application (e.g., the long press touch gesture associated with the icon representative of the application).

As shown by reference number 145, based on obtaining the one or more messages, the user device may cause information indicative of at least one message of the one or more messages to be displayed by the user device. For example, the user device may cause information indicative of the message to be displayed in the user interface presented by the user device (e.g., the user interface that includes the icon for the application). In some implementations, the user device may cause the information indicative of the message to be displayed in a menu associated with the application in connection with a long press touch gesture, as described above. In other words, the user device may cause the information indicative of the message to be displayed while the application is in the unlaunched state.

In some implementations, the user device may determine a prioritization for the one or more messages based on the prioritization information transmitted with the one or more messages. Accordingly, the user device may cause the display of respective information indicative of each of the one or more messages in accordance with the determined prioritization. For example, the user device may cause the display of respective information indicative of each of the one or more messages in accordance with an order of priority of the one or more messages (e.g., information indicative of a higher priority message is displayed above information indicative of a lower priority message). As another example, the user device may cause the display of information indicative of a first message (e.g., a higher priority message), of the one or more messages, and may not display information indicative of a second message (e.g., a lower priority message) of the one or more messages.

Information indicative of a message may include an indication that the message is available for viewing by the user (e.g., the indication does not identify any content of the message, but merely indicates that the message is available). Additionally, or alternatively, information indicative of the message may include a content of the message. For example, the information indicative of the message may include a version of the message that is used when the user is unauthenticated for use of the application. As an example, the information indicative of the message may include the full version of the message (e.g., if the full version of the message is suitable for viewing when the user is unauthenticated) or the alternative version of the message (e.g., if only the alternative version of the message is suitable for viewing when the user is unauthenticated). In some implementations, the user device may cause the display of a full version of a first message (e.g., "offer for a new credit card," as shown), of the one or more messages, and cause the display of an alternative version of a second message (e.g., "payment due tomorrow," as shown) of the one or more messages.

As shown by reference number 150, the user device may receive a different user input (different from the user input described above in connection with reference number 115) indicative of a request to view one or more of the messages. For example, the different user input may be a tap touch gesture on an area of a display of the user device associated with the information indicative of the messages. In some implementations, the user input indicative of the request to view the one or more messages may be a tap touch gesture on an area of a display of the user device associated with the icon representative of the application. That is, a request to launch the application may also be a request to view the one or more messages (e.g., regardless of whether messages were obtained by the user device when the application was in the unlaunched state).

Figure 1D:
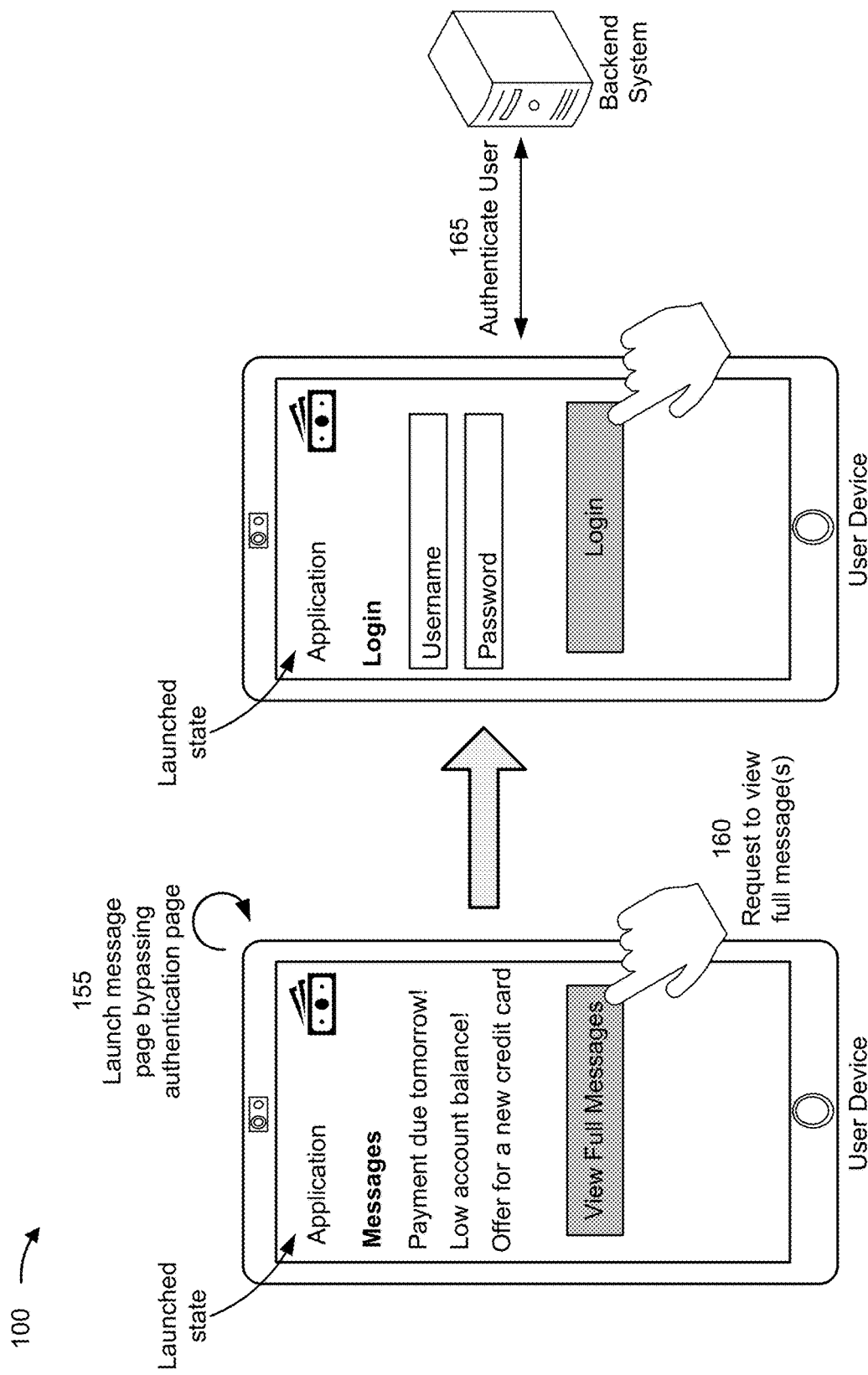

As shown in FIG. 1D, and by reference number 155, based on receiving the different user input, the user device may cause the application to launch to a message page (e.g., a user interface for display of messages) that bypasses an authentication page (e.g., a user interface for authentication) of the application. That is, the user device may cause the application to launch (e.g., initiate the launched state of the application). However, rather than launching the application to the authentication page of the application (e.g., which may be in accordance with a normal operation of the application), the user device may cause the application to launch to the message page that bypasses the authentication page (e.g., the user device may cause the application to launch in a manner in which the authentication page is skipped, such that authentication of the user is not performed).

The message page may include the one or more messages of the application obtained by the user device. For example, the user device may cause a version of a message, that is used when the user is unauthenticated, to be displayed in the message page. As an example, the version of the message may be the full version of the message (e.g., if the full version of the message is suitable for viewing when the user is unauthenticated) or the alternative version of the message (e.g., if only the alternative version of the message is suitable for viewing when the user is unauthenticated). In some implementations, the user device may obtain one or more additional messages of the application (e.g., if less than all of the messages of the application were previously obtained by the user device for display when the application was in the unlaunched state), and cause versions of the additional message(s) to be displayed in the message page, in a similar manner as described above.

As shown by reference number 160, the user device may receive a request from the user to view the full versions of the messages (e.g., of one or more messages for which the alternative version is displayed). The user device may receive the request while the application is in the launched state. Based on receiving the request, as shown, the user device may invoke the authentication page of the application. The authentication page may include a user interface in which the user may enter authentication credentials (e.g., a username and a password). Alternatively, upon invoking the authentication page, the user device may determine that the user is previously authenticated with the application. As shown by reference number 165, the user device and the backend system may perform a process for authenticating the user. For example, the user device may transmit an authentication request to the backend system that includes authentication information (e.g., the authentication credentials or information indicating previous authentication of the user), and the backed system may respond with an authentication response (e.g., that includes an authentication token, or the like).

Figure 1E:
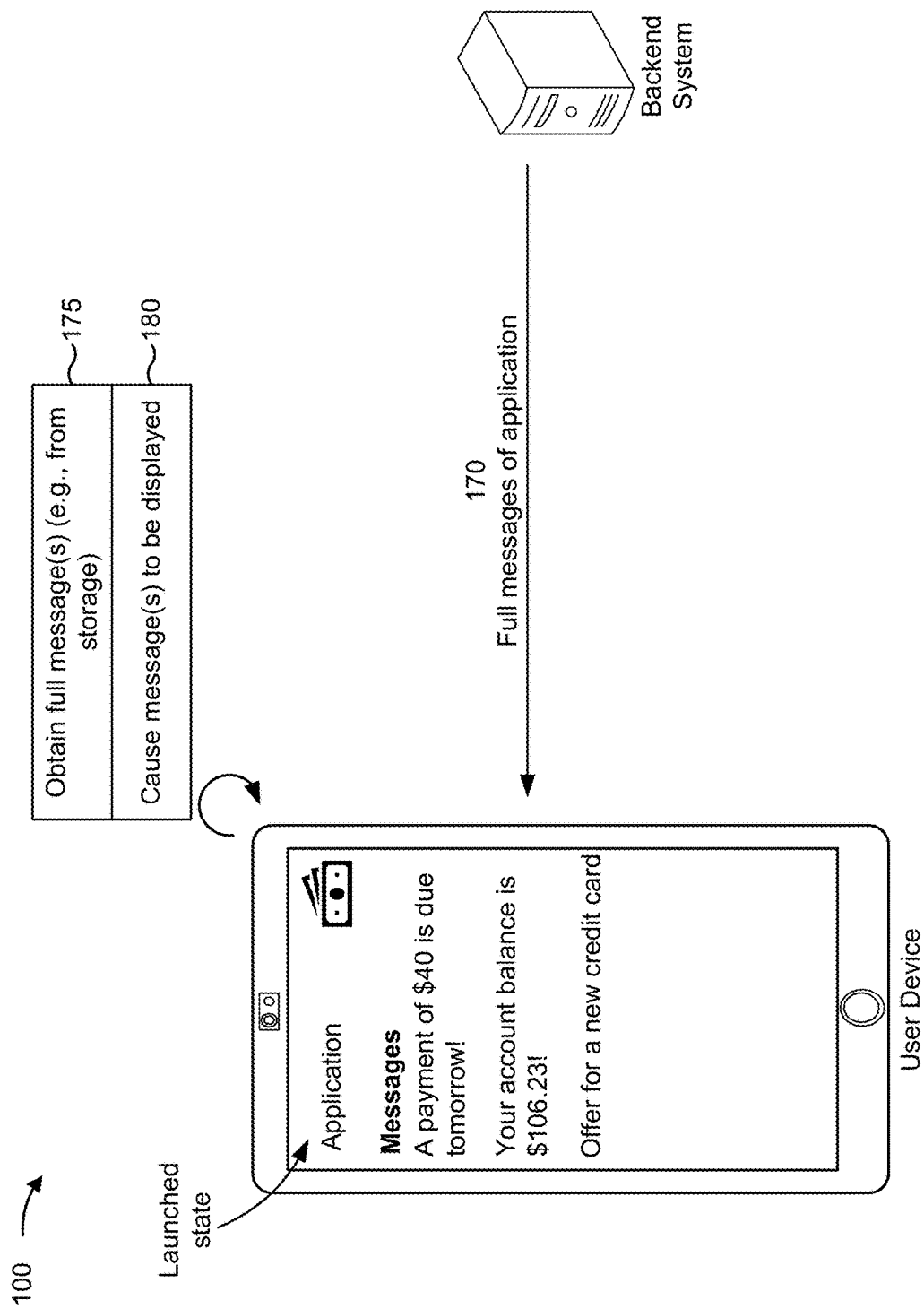

As shown in FIG. 1E, and by reference number 170, the backend system may transmit full versions of one or more messages of the application. For example, the backend system may transmit a full version of a message for which the backend system previously transmitted only an alternative version. In some implementations, the backend system may transmit the full versions in the authentication response. In some implementations, the backend system may transmit the full versions in response to a request for the messages transmitted by the user device. Here, the request for the messages may include the authentication token or another indication that the user is authenticated for use of the application.

As shown by reference number 175, the user device may obtain full versions of one or more messages of the application. The one or more messages may include multiple messages. In some implementations, the user device may obtain the full versions from a storage (e.g., a message cache) of the user device. For example, the user device may obtain the full versions stored by the user device, as described above in connection with reference number 110. In some implementations, if messages were not previously stored by the user device (as described above in connection with reference number 110), the user device may obtain the full versions by receiving the full versions of the one or more messages transmitted by the backend system, as described above in connection with reference number 170. The user device may obtain the full versions of the one or more messages while the application is in the launched state. Moreover, the user device may obtain the full versions of the one or more messages based on authenticating the user for use of the application (e.g., via the authentication page of the application).

As shown by reference number 180, based on obtaining the full versions of the one or more messages, the user device may cause the full versions to be displayed by the user device. For example, the user device may cause the full versions to be displayed in the message page of the application. Thus, as shown, before the user is authenticated, the user device may cause the display of an alternative version of a message indicating "low account balance," whereas after the user is authenticated, the user device may cause the display of a full version of the message indicating "your account balance is $106.23."

In this way, the user device and the backend system may communicate messages of the application while the application is in the unlaunched state. For example, the user may view information indicative of the messages without launching the application and without performing an authentication with the application, thereby conserving computing resources and/or network resources associated with excessive launching of applications to view messages and/or excessive authentication processes to view messages. Thereafter, if the user indicates interest in one or more messages, the user device may launch the application, and the user device and the backend system may communicate messages while the application is in the launched state.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
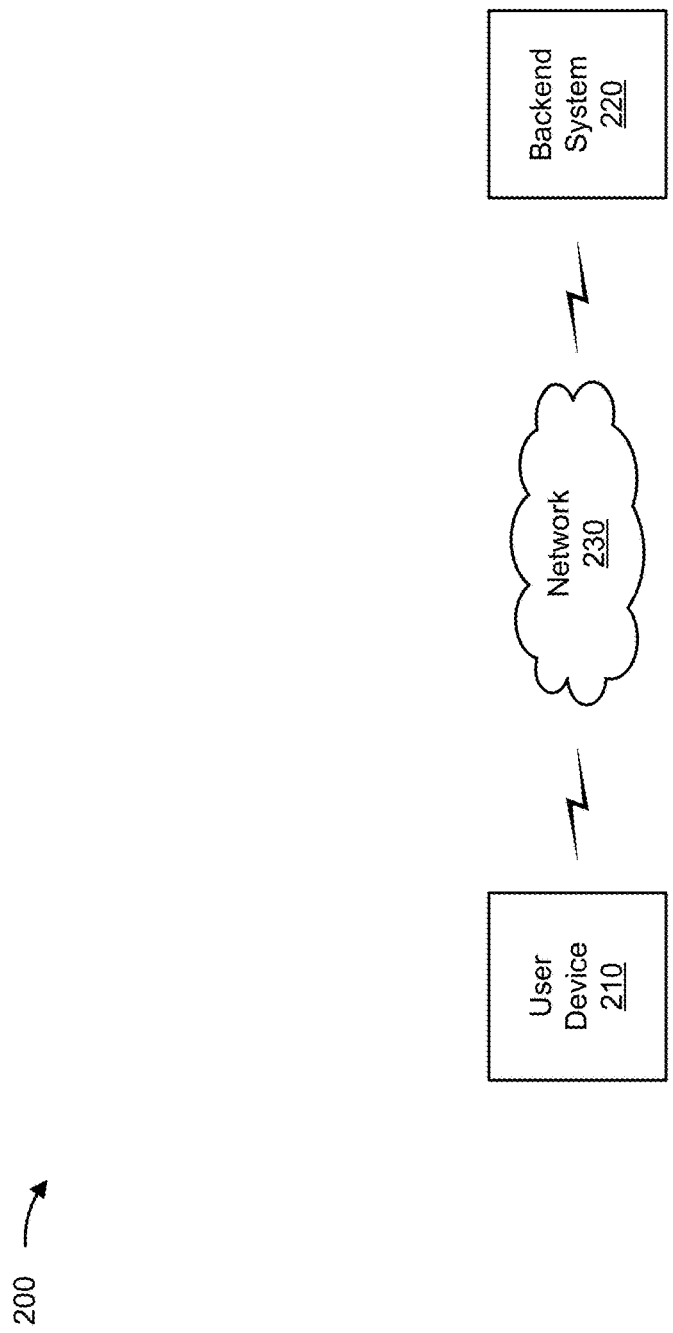
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a backend system 220, and a network 230. Devices of environment 200 may interconnect via wired connections, wireless connections, or a combination of wired and wireless connections.

The user device 210 includes one or more devices capable of receiving, generating, storing, processing, and/or providing information associated with messages of an application, as described elsewhere herein. The user device 210 may include a communication device and/or a computing device. For example, the user device 210 may include a wireless communication device, a mobile device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The backend system 220 includes one or more devices capable of receiving, generating, storing, processing, providing, and/or routing information associated with messages of an application, as described elsewhere herein. The backend system 220 may include a communication device and/or a computing device. For example, the backend system 220 may include a server device, such as an application server, a client server, a web server, a database server, a host server, a proxy server, a virtual server (e.g., executing on computing hardware), or a server in a cloud computing system. In some implementations, the backend system 220 includes computing hardware used in a cloud computing environment. The backend system 220 may communicate with the user device 210 in order to support operations of an application implemented by the user device 210. The backend system 220 may be remotely located from the user device 210 (e.g., the backend system 220 may include a remote device relative to the user device 210).

The network 230 includes one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The quantity and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
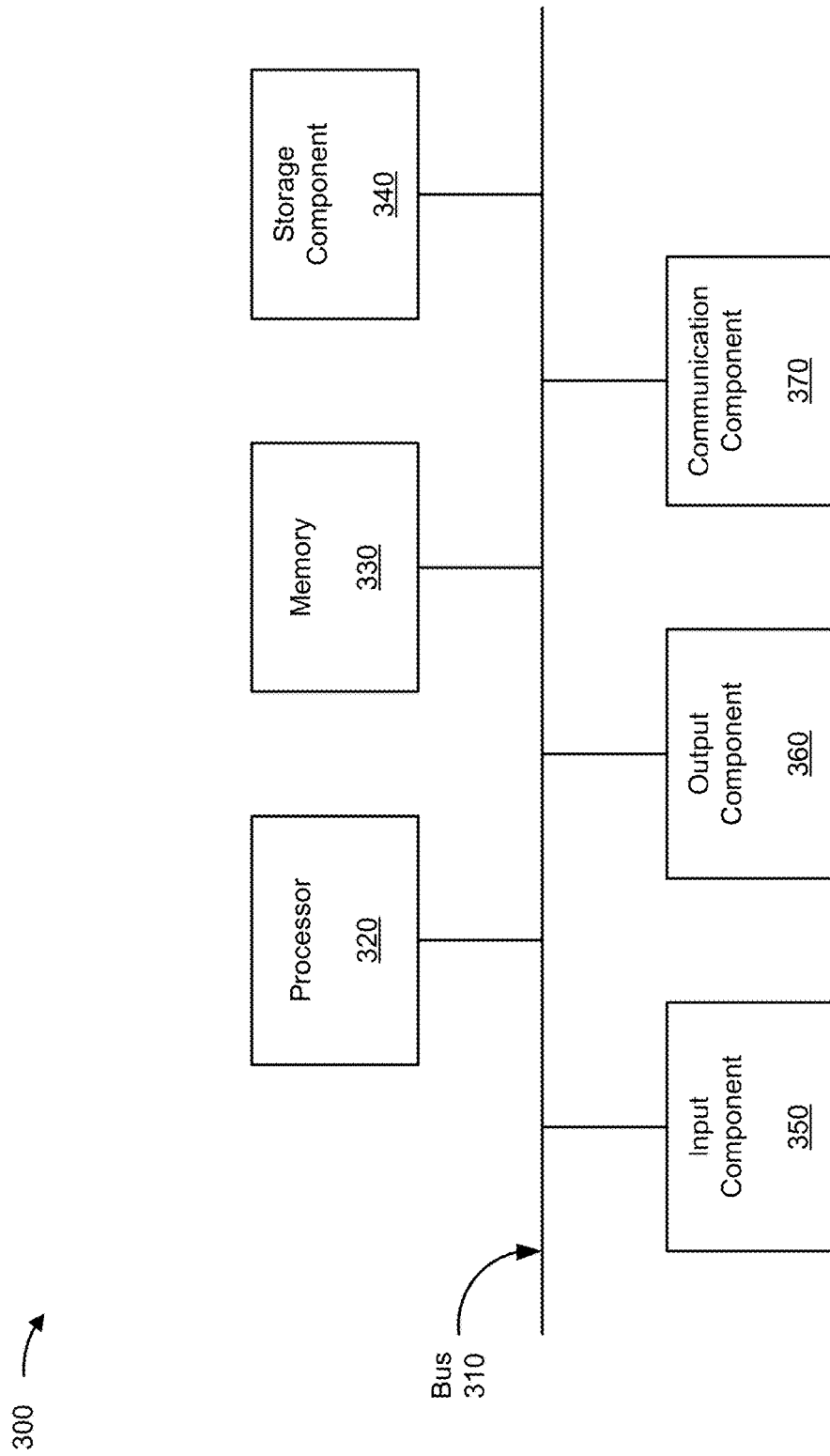
FIG. 3 is a diagram of example components of one or more devices of FIG. 2.

FIG. 3 is a diagram of example components of a device 300, which may correspond to user device 210 and/or backend system 220. In some implementations, user device 210 and/or backend system 220 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The quantity and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
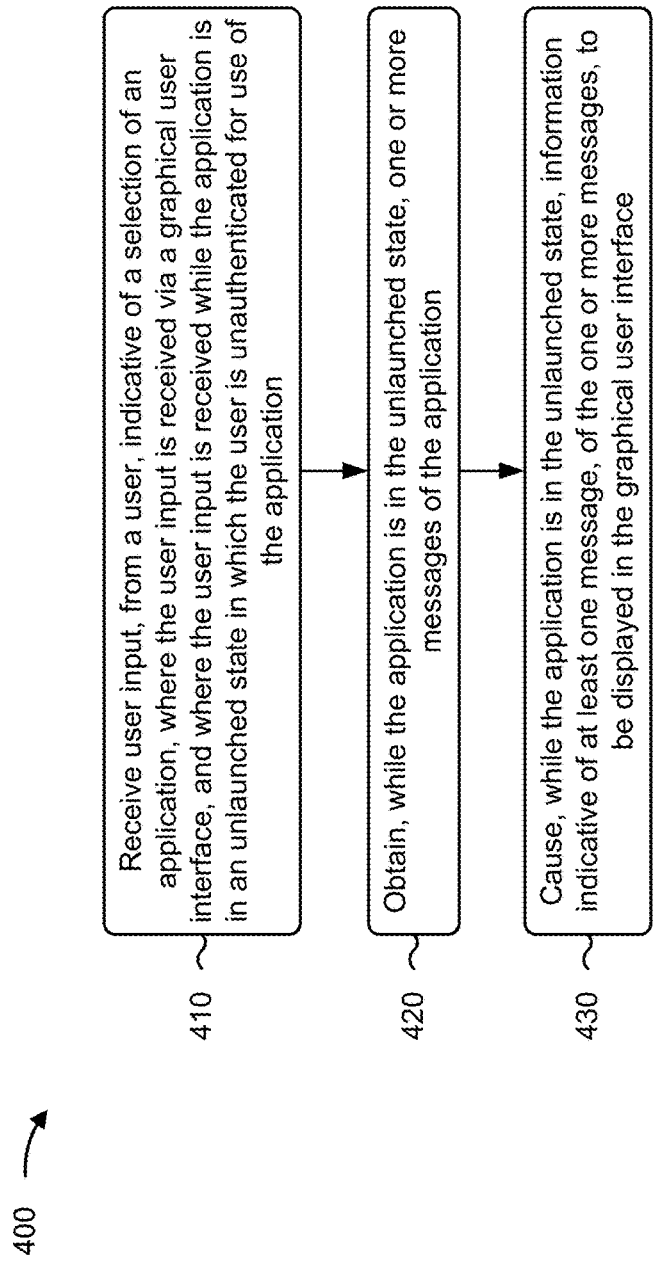
FIGS. 4-5 are flowcharts of example processes relating to communication of messages of an application in an unlaunched state.

FIG. 4 is a flowchart of an example process 400 associated with communication of messages of an application. In some implementations, one or more process blocks of FIG. 4 may be performed by a device (e.g., user device 210). In some implementations, one or more process blocks of FIG. 4 may be performed by another device or a group of devices separate from or including the device, such as backend system 220. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving user input, from a user, indicative of a selection of an application, wherein the user input is received via a graphical user interface, and wherein the user input is received while the application is in an unlaunched state in which the user is unauthenticated for use of the application (block 410). As further shown in FIG. 4, process 400 may include obtaining, while the application is in the unlaunched state, one or more messages of the application (block 420). As further shown in FIG. 4, process 400 may include causing, while the application is in the unlaunched state, information indicative of at least one message, of the one or more messages, to be displayed in the graphical user interface (block 430).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
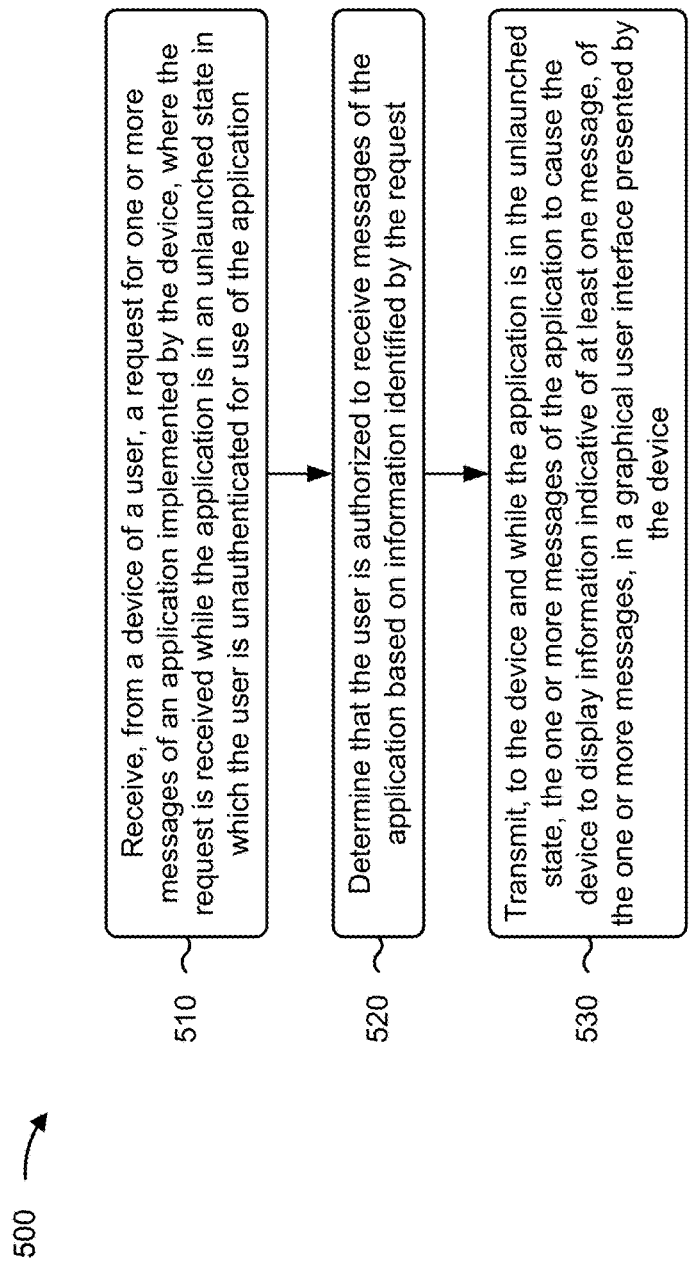

FIG. 5 is a flowchart of an example process 500 associated with communication of messages of an application. In some implementations, one or more process blocks of FIG. 5 may be performed by a system (e.g., backend system 220). In some implementations, one or more process blocks of FIG. 5 may be performed by another device or a group of devices separate from or including the system, such as user device 210. Additionally, or alternatively, one or more process blocks of FIG. 5 may be performed by one or more components of device 300, such as processor 320, memory 330, storage component 340, input component 350, output component 360, and/or communication component 370.

As shown in FIG. 5, process 500 may include receiving, from a device of a user, a request for one or more messages of an application implemented by the device, wherein the request is received while the application is in an unlaunched state in which the user is unauthenticated for use of the application (block 510). As further shown in FIG. 5, process 500 may include determining that the user is authorized to receive messages of the application based on information identified by the request (block 520). As further shown in FIG. 5, process 500 may include transmitting, to the device and while the application is in the unlaunched state, the one or more messages of the application to cause the device to display information indicative of at least one message, of the one or more messages, in a graphical user interface presented by the device (block 530).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A non-transitory computer-readable medium storing a set of instructions for obtaining messages of an application, the set of instructions comprising:
   one or more instructions that, when executed by one or more processors of a device, cause the device to:
     receive user input, from a user, indicative of a selection of the application implemented by the device,
       wherein the user input is received via a graphical user interface presented by the device, and
       wherein the user input is received while the application is in an unlaunched state in which the user is unauthenticated for use of the application;
     transmit, to a remote device and while the application is in the unlaunched state, a request for one or more messages of the application;

receive, from the remote device and based on an authorization of the user that uses information identified by the request, the one or more messages of the application; and cause, while the application is in the unlaunched state, information indicative of at least one message, of the one or more messages, to be displayed in the graphical user interface.

2. The non-transitory computer-readable medium of claim 1, wherein the user input indicative of the selection of the application is a long press touch gesture on a display of the device.

3. The non-transitory computer-readable medium of claim 1, wherein the information identified by the request includes an identifier of the device, and wherein the authorization of the user is based on the identifier of the device.

4. The non-transitory computer-readable medium of claim 1, wherein the information indicative of the at least one message comprises an indication that the at least one message is available or a content of the at least one message.

5. The non-transitory computer-readable medium of claim 1, wherein the information indicative of the at least one message comprises a version of the at least one message that is used when the user is unauthenticated for use of the application.

6. The non-transitory computer-readable medium of claim 1, wherein the one or more instructions, when executed by the one or more processors, further cause the device to:

receive a different user input indicative of a request to view the at least one message;

cause the application to launch to a page that bypasses an authentication page of the application; and cause a version of the at least one message, that is used when the user is unauthenticated for use of the application, to be displayed in the page.

7. The non-transitory computer-readable medium of claim 1, wherein the at least one message includes multiple messages, and wherein respective information indicative of each of the multiple messages is displayed in an order of priority associated with the multiple messages.

8. A method of obtaining messages of an application, comprising:

receiving, at a device of a user, user input indicative of a selection of the application implemented by the device, wherein the user input is received via a graphical user interface presented by the device, and wherein the user input is received while the application is in an unlaunched state in which the user is unauthenticated for use of the application;

obtaining, by the device and while the application is in the unlaunched state, one or more messages of the application; and causing, by the device and while the application is in the unlaunched state, information indicative of at least one message, of the one or more messages, to be displayed in the graphical user interface.

9. The method of claim 8, wherein the user input indicative of the selection of the application is a long press touch gesture on a display of the device.

10. The method of claim 8, further comprising:

receiving the one or more messages from a remote device; and storing the one or more messages in a storage of the device.

11. The method of claim 10, wherein the one or more messages are obtained from the storage of the device.

12. The method of claim 10, wherein receiving the one or more messages comprises:

receiving first versions of the one or more messages that are used when the user is authenticated for use of the application and second versions of the one or more messages that are used when the user is unauthenticated for use of the application.

13. The method of claim 12, wherein the information indicative of the at least one message comprises one of the second versions of the one or more messages associated with the at least one message.

14. The method of claim 8, further comprising:

transmitting, to a remote device and while the application is in the unlaunched state, a request for the one or more messages, wherein the one or more messages are obtained from the remote device based on the request.

15. A system for providing messages of an application, the system comprising:

one or more memories; and one or more processors, communicatively coupled to the one or more memories, configured to:

receive, from a device of a user, a request for one or more messages of the application implemented by the device, wherein the request is received while the application is in an unlaunched state in which the user is unauthenticated for use of the application;

determine that the user is authorized to receive messages of the application based on information identified by the request; and transmit, to the device and while the application is in the unlaunched state, the one or more messages of the application to cause the device to display information indicative of at least one message, of the one or more messages, in a graphical user interface presented by the device.

16. The system of claim 15, wherein the information identified by the request includes an identifier of the device.

17. The system of claim 16, wherein the one or more processors, when determining that the user is authorized to receive messages of the application, are configured to:

determine whether the identifier of the device has an association with an account of the user.

18. The system of claim 15, wherein the one or more processors are further configured to:

determine that a message of the one or more messages includes information that is not to be displayed when the user is unauthenticated for use of the application; and determine a version of the message that is to be used when the user is unauthenticated for use of the application.

19. The system of claim 18, wherein the one or more processors, when transmitting the one or more messages, are configured to:

transmit the version of the message without transmitting the message.

20. The system of claim 15, wherein the one or more messages are transmitted with information for use in identifying a priority order for the one or more messages.

* * * * *